(12) United States Patent
Volny et al.

(10) Patent No.: US 10,946,970 B2
(45) Date of Patent: Mar. 16, 2021

(54) SYSTEMS FOR REMOVAL OF PARACHUTE ASSEMBLY HEAD RESTRAINTS

(71) Applicant: GOODRICH CORPORATION, Charlotte, NC (US)

(72) Inventors: Jaro S. Volny, Scottsdale, AZ (US); Kassidy L. Carson, Colorado Springs, CO (US); Scott R. Patterson, Manitou Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 180 days.

(21) Appl. No.: 16/138,415

(22) Filed: Sep. 21, 2018

(65) Prior Publication Data

US 2020/0094975 A1 Mar. 26, 2020

(51) Int. Cl.
*B64D 17/30* (2006.01)
*B64D 25/02* (2006.01)
*B64D 25/10* (2006.01)

(52) U.S. Cl.
CPC ............. *B64D 25/02* (2013.01); *B64D 17/30* (2013.01); *B64D 25/10* (2013.01)

(58) Field of Classification Search
CPC ...................................................... B64D 17/30
See application file for complete search history.

(56) References Cited

U.S. PATENT DOCUMENTS

| | | | |
|---|---|---|---|
| 1,640,270 A | 8/1927 | Russell | |
| 2,708,083 A | 5/1955 | Martin | |
| 3,372,893 A | 3/1968 | Larsen | |
| 3,498,565 A * | 3/1970 | Nash-Boulden | B64C 31/036 244/152 |
| 3,768,761 A | 10/1973 | Cramer | |
| 3,841,590 A * | 10/1974 | Valentine | B64D 25/08 244/138 R |
| 3,921,944 A | 11/1975 | Morrison | |
| 4,399,969 A * | 8/1983 | Gargano | B64D 17/025 244/145 |
| 4,466,662 A | 8/1984 | McDonald | |
| 4,637,577 A | 1/1987 | Miseyko | |
| 4,687,160 A | 8/1987 | Logemann | |
| 4,850,554 A | 7/1989 | Strong | |
| 4,923,147 A | 5/1990 | Adams et al. | |

(Continued)

FOREIGN PATENT DOCUMENTS

| | | |
|---|---|---|
| DE | 4334743 | 10/1994 |
| FR | 2750395 | 10/1998 |

(Continued)

OTHER PUBLICATIONS

USPTO, Pre-Interview First Office Action dated Oct. 30, 2020 in U.S. Appl. No. 16/138,014.

(Continued)

*Primary Examiner* — Philip J Bonzell
*Assistant Examiner* — Tye William Abell
(74) *Attorney, Agent, or Firm* — Snell & Wilmer L.L.P.

(57) ABSTRACT

A system for translating a head restraint of a parachute assembly away from a head of an occupant supported by the parachute assembly may comprise a chord coupled to the head restraint and at least one of a control line configured to manipulate a canopy of the parachute assembly or a handle coupled to the control line.

10 Claims, 7 Drawing Sheets

(56) References Cited

U.S. PATENT DOCUMENTS

| | | | |
|---|---|---|---|
| 5,039,035 A | 8/1991 | Fitzpatrick | |
| 5,301,903 A | 4/1994 | Aronne | |
| 6,708,927 B2 | 3/2004 | Chen | |
| 7,703,152 B2 | 4/2010 | Rhodes et al. | |
| 9,038,948 B2 | 5/2015 | Ruff et al. | |
| 9,924,755 B2 | 3/2018 | Margetis | |
| 2004/0182644 A1 | 9/2004 | Kotarski | |
| 2012/0012421 A1 | 1/2012 | Morgan | |
| 2013/0092796 A1 | 4/2013 | Weinel | |
| 2017/0106987 A1* | 4/2017 | Adams | B64D 25/10 |
| 2017/0349292 A1 | 12/2017 | Adams et al. | |
| 2020/0094972 A1 | 3/2020 | Volney et al. | |
| 2020/0094973 A1 | 3/2020 | Volney et al. | |
| 2020/0094974 A1 | 3/2020 | Volney et al. | |
| 2020/0094975 A1 | 3/2020 | Volney et al. | |

FOREIGN PATENT DOCUMENTS

| | | |
|---|---|---|
| RU | 2621133 | 5/2017 |
| RU | 2624122 | 6/2017 |

OTHER PUBLICATIONS

USPTO, Pre-Interview First Office Action dated Dec. 22, 2020 in U.S. Appl. No. 16/138,216.
USPTO, Pre-Interview First Office Action dated Dec. 21, 2020 in U.S. Appl. No. 16/138,336.

* cited by examiner

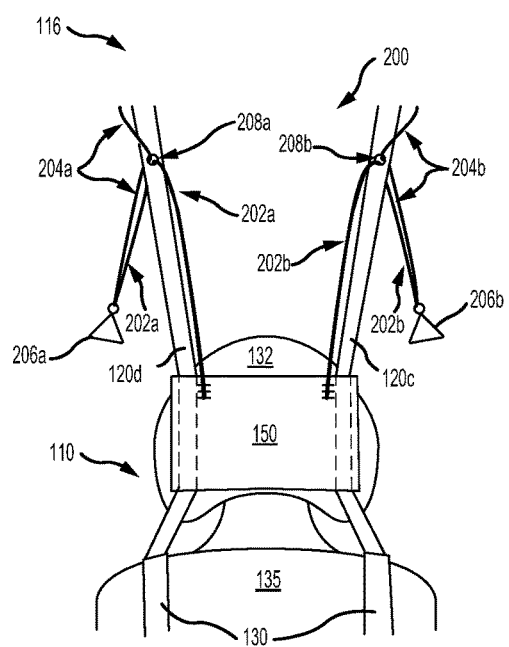
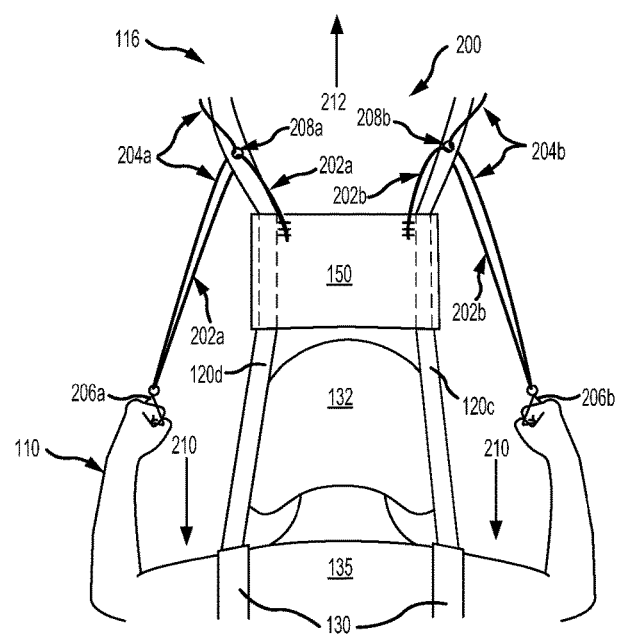
FIG. 4A
FIG. 4B

SYSTEMS FOR REMOVAL OF PARACHUTE ASSEMBLY HEAD RESTRAINTS

FIELD

The present disclosure relates to parachutes, and more specifically, to systems for removal of parachute assembly head restraints.

BACKGROUND

Ejection seats are designed to eject pilots from an aircraft, with the pilot oriented in an generally upright, sitting position. Conventionally, the pilot is released from the ejection seat in response to a main canopy of the ejection seat's parachute assembly deploying. As the canopy catches wind, the pilot may be rotated to orient the pilot in the direction of canopy line stretch. As the pilot is rotated in-line with the force provided by the canopy, there is an increased risk of neck hyperextension and injury due to the change in angular momentum forcing the pilot's head rearward. Head restraints may be provided to limit translation of the pilot's head. However, having the head restraint in place during steady state decent can be uncomfortable and may also restrict a range of motion of the pilot's head, thereby limiting the pilot's sight lines, which can affect his/her ability to look for a clear landing area.

SUMMARY

Disclosed herein is a system for translating a head restraint of a parachute assembly. In accordance with various embodiments, the system may comprise a first control line configured to manipulate a canopy of the parachute assembly, a first handle coupled to the first control line, and a first chord coupled to the head restraint and at least one of the first control line or the first handle.

In various embodiments, the first chord may be located through an opening defined by a riser of the parachute assembly.

In various embodiments, a sleeve may be coupled to a riser of the parachute assembly. The sleeve may be configured to retain the first handle proximate the riser.

In various embodiments, the first control line may comprise a first length extending from the canopy to an attachment point of the first chord to the first control line, and a second length extending from the attachment point to the first handle. In various embodiments, the second length may be configured to be released upon a removal of the first handle from the sleeve. The first chord may be configured to translate the head restraint along the riser upon release of the second length of the first control line.

In various embodiments, a second control line may be coupled to the canopy, and a second chord may be coupled to the head restraint. In various embodiments, the first chord and the second chord may be configured to translate the head restraint along a left shoulder riser and a right shoulder riser of the parachute assembly.

Also disclosed herein is a parachute assembly. In accordance with various embodiments, the parachute assembly may comprise a canopy, a plurality of suspension lines coupled to the canopy, a first riser coupled to a first suspension line of the plurality of suspension lines, a second riser coupled to a second suspension line of the plurality of suspension lines, a head restraint located between the first riser and the second riser, and a head restraint removal system configured to translate the head restraint.

In various embodiments, the head restraint removal system may comprise a cutter configured to sever the head restraint. In various embodiments, a reefing line may be coupled to the canopy, and the head restraint removal system may comprise a coupling between the reefing line and the head restraint.

In various embodiments, the head restraint removal system may be configured to translate the head restraint along the first riser and the second riser. A control line may be configured to manipulate the canopy, and a handle may be coupled to the control line. In various embodiments, the head restraint removal system may comprise a chord coupled to the head restraint and at least one of the control line or the handle.

In various embodiments, the chord may be located through an opening defined by the first riser. In various embodiments, a sleeve may be coupled to the first riser. The sleeve may be configured to retain the handle proximate the first riser. In various embodiments, the control line may comprise a first length extending from the canopy to an attachment point of the chord to the control line, and a second length extending from the attachment point to the handle. The second length may be configured to release upon a removal of the handle from the sleeve. In various embodiments, the head restraint may be configured to translate along the first riser and the second riser in response to the removal of the handle from the sleeve.

Also disclosed herein is a parachute assembly for an ejection seat. In accordance with various embodiments, the parachute assembly may comprise a canopy, a suspension line coupled to the canopy, a riser coupled to the suspension line, and a head restraint configured to translate along the riser.

In various embodiments, a control line may be configured to manipulate the canopy, a handle may be coupled to the control line, and a chord may be coupled to the head restraint and at least one of the control line or the handle.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 4A and 4B illustrate a forward view of an active head restraint removal system for a parachute assembly, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
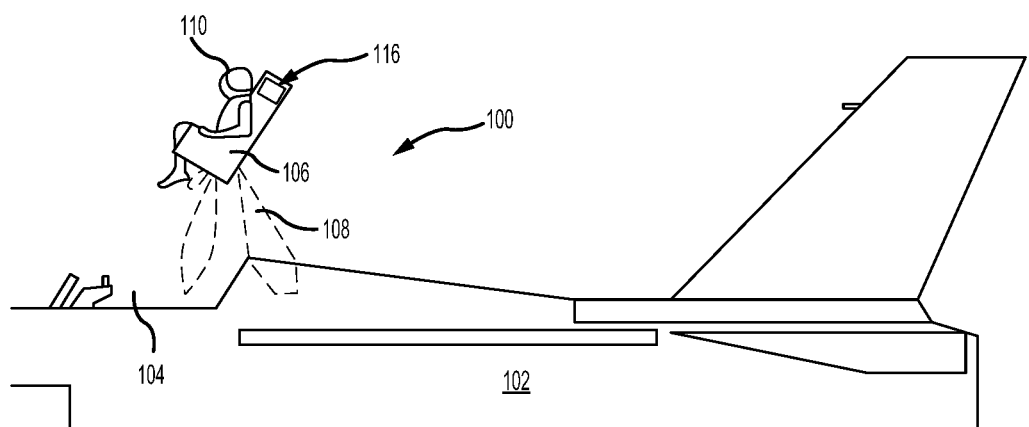
FIG. 1 illustrates an ejection seat being launched from an aircraft cockpit, in accordance with various embodiments.

In various embodiments, and with reference to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
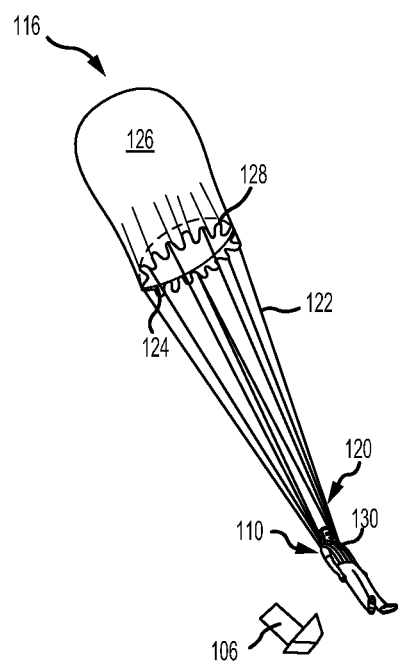
FIG. 2 illustrates a perspective view of a parachute assembly in a deployed state after separation from an ejection seat, in accordance with various embodiments.

With reference to FIG. 2, parachute assembly 116 is illustrated in a deployed state, in accordance with various embodiments. Parachute assembly 116 may be used to increase a drag of, or otherwise decelerate occupant 110, in response to occupant 110 being ejected, jumped, ditched, and/or dropped (collectively, "ejected") from an aircraft. Parachute assembly 116 may be configured to deploy upon separation of occupant 110 from ejection seat 106. Stated differently, in various embodiments, deployment of parachute assembly 116 may be configured to separate occupant 110 from ejection seat 106. Parachute assembly 116 may comprise a canopy 126, suspension lines 122, and risers 120.

Upon deployment of parachute assembly 116, canopy 126 may open to increase drag, or otherwise decelerate, occupant 110. Canopy 126 may comprise any suitable type of canopy and any suitable type of material, such as, for example, canvas, silk, nylon, aramid fiber (e.g., KEVLAR®), polyethylene terephthalate, and/or the like. Suspension lines 122 may be coupled to canopy 126 using any suitable attachment technique, such as, for example, through stitching. Suspension lines 122 may be configured to at least partially stabilize deployed canopy 126. In various embodiments, parachute assembly 116 may include one or more reefing line(s) 124. Reefing line 124 may be coupled to canopy 126 proximate a circumferential edge 128 of canopy 126. Reefing line 124 may also be coupled to suspension lines 122. Reefing line 124 is configured to restrict expansion of canopy 126 such that canopy 126 opens in stages. For example, reefing line 124 may be cut, or otherwise severed, at a preselected time after deployment of canopy 126. Prior to cutting reefing line 124, canopy 126 is held at a first, restricted diameter; after reefing line 124 is severed, canopy 126 is able to open further and its diameter increases. Opening canopy 126 in stages may reduce opening shock to parachute assembly 116. The time delay between deploying canopy 126 and severing reefing line 124 may comprise any suitable time delay based on properties of parachute assembly 116, the type of aircraft, and/or the load limitations of the object (e.g., occupant 110) being carried by parachute assembly 116.

In various embodiments, suspension lines 122 may be configured to connect canopy 126 to risers 120. Suspension lines 122 and risers 120 may comprise any suitable material. For example, suspension lines 122 may comprise a tubular braided material that constricts in diameter under tension, such as, for example, nylon, aramid fiber (e.g., KEVLAR®), and/or the like. Risers 120 may comprise a webbing formed from nylon, aramid fiber (e.g., KEVLAR®), and/or the like. Risers 120 may be configured to attach to a harness 130, or other structure, configured to secure occupant 110 to risers 120. In various embodiments, parachute assembly 116 may comprise a plurality of risers 120 attached to harness 130.

Figure 3:
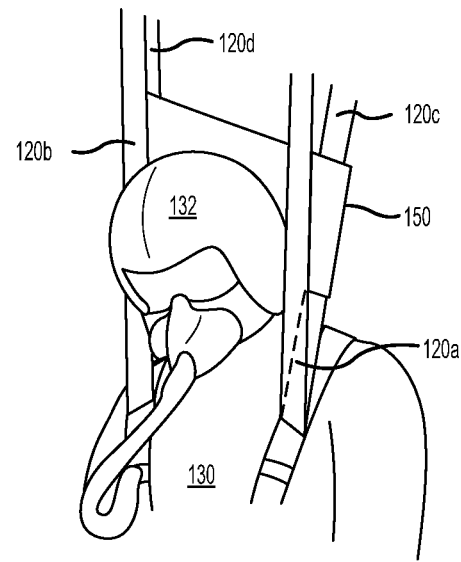
FIG. 3 illustrates a perspective view of a parachute assembly in a deployed state with a head restraint disposed behind the head of the occupant supported by the parachute assembly, in accordance with various embodiments.

With reference to FIG. 3, in various embodiments, parachute assembly 116 may comprise left shoulder risers 120a and 120c, and right shoulder risers 120b and 120d. Left shoulder risers 120a and 120c are attached proximate a left shoulder 134 of occupant 110 and/or are configured to be located over left shoulder 134 of occupant 110 upon deployment of parachute assembly 116. Right shoulder risers 120b and 120d are attached proximate a right shoulder 136 of occupant 110 and/or are configured to be located over right shoulder 136 of occupant 110 upon deployment of parachute assembly 116.

In various embodiments, left shoulder riser 120a is located forward of left shoulder riser 120c, and right shoulder riser 120b is located forward of right shoulder riser 120d. Stated differently, left shoulder riser 120c and right shoulder riser 120d may be located closer to a backside 135 of occupant 110 as compared, respectively, to left shoulder riser 120a and right shoulder riser 120b. As used herein, "forward" refers to the side of harness 130 configured to be attached to a front side of an occupant. Backside 135 of occupant 110 is generally opposite a front side 137 of occupant 110.

In various embodiments, left shoulder risers 120a and 120c may be attached to harness 130 at an attachment location 138, and right shoulder risers 120b and 120d may be attached to harness 130 at an attachment location 140.

Attachment locations 138 and 140 are on an end of risers 120 that is opposite suspension lines 122, with momentary reference to FIG. 2. Attachment locations 138 and 140 may comprise any suitable attachment mechanism (e.g., stitching, adhesive, etc.) for securing risers 120 to harness 130. In various embodiments, attachment locations 138 and 140 may each comprise a hoop, or ring, attached to harness 130 and located through a loop formed by risers 120. In various embodiments, each riser 120 (e.g., left shoulder riser 120a, right shoulder riser 120b, left shoulder riser 120c, right shoulder riser 120d) may have its own attachment location on harness 130.

With combined reference to FIG. 2 and FIG. 3, in various embodiments, parachute assembly 116 may comprise a greater number of suspension lines 122 as compared to the number of risers 120. For example, each riser 120 may couple to multiple suspension lines 122, such as, for example 1 to 16 suspension lines 122 per riser 120, 8 to 16 suspension lines 122 per riser 120, etc. In this regard, left shoulder riser 120a, right shoulder riser 120b, left shoulder riser 120c, and right shoulder riser 120d may each couple to its own individual set of suspension lines 122.

As canopy 126 catches wind, occupant 110 may be rotated in-line with the direction of suspension line stretch. As occupant 110 is rotated, a rearward force may be exerted on the neck of occupant 110. As used herein, "rearward" refers to the side of harness 130 configured to be attached to a backside of an occupant supported by parachute assembly 116. In accordance with various embodiments, parachute assembly 116 may include a head restraint 150 (FIG. 3). Head restraint 150 is configured to be located rearward of the head 132 of occupant 110, upon deployment of parachute assembly 116. Head restraint 150 is configured to limit translation of head 132 in the rearward direction, thereby reducing a likelihood of head and/or neck injury to occupant 110. Head restraint 150 may limit a range of motion of head 132 and/or may locate head 132 in an uncomfortable position. Accordingly, parachute assembly 116 may include a head restraint removal system configured to translate head restraint away from head 132.

Referring to FIG. 4A, a forward view of a head restraint removal system 200 of parachute assembly 116 is illustrated, in accordance with various embodiments. Head restraint removal system 200 includes a first chord 202a and a second chord 202b. First and second chords 202a, 202b are each coupled to head restraint 150. First and second chords 202a, 202b may be coupled to head restraint 150 using any suitable attachment technique, for example, using stitching, adhesive, friction coupling, etc. First and second chords 202a, 202b may comprise any suitable material rope, canvas, silk, nylon, aramid fiber (e.g., KEVLAR®), polyethylene terephthalate, polyvinyl chloride, etc.

First chord 202a may be coupled to a left hand (or first) handle 206a of parachute assembly 116. Second chord 202b may be coupled to a right hand (or second) handle 206b of parachute assembly 116. Left hand handle 206a is also coupled to a first control line 204a of parachute assembly 116. Right hand handle 206b is also coupled to a second control line 204b of parachute assembly 116. First and second control lines 204a, 204b are configured to manipulate, and may be coupled to, canopy 126, with momentary reference to FIG. 2, of parachute assembly 116. For example, occupant 110 may be able to steer and/or reduce a speed (e.g., increase drag) of parachute assembly using first and control lines 204a, 204b.

In various embodiments, first control line 204a and first chord 202a may be located through a first aperture 208a defined by left shoulder (or first) riser 120d. Second control line 204b and second chord 202b may be located through a second aperture 208b defined by right shoulder (or second) riser 120c.

Referring now to FIG. 4B, after initial deployment of parachute assembly 116, for example, after canopy 126 has fully, or at least substantially, opened, occupant 110 may grip and pull left and right handles 206a, 206b in a direction of arrows 210 to begin steering and/or slowing parachute assembly for descent and landing. Translating left and right handles 206a, 206b in the direction of arrows 210 causes head restraint 150 to translate in the direction of arrow 212 along left and right shoulder risers 120c, 120d. Stated differently, occupant 110 pulling left and right handles 206a, 206b in the direction of arrows 210 may translate head restraint 150 away from head 132. Head restraint removal system 200 is thus configured to have head restraint 150 limit rearward motion of head 132 during peak deployment forces to reduce possibility of neck injury, and remove head restraint 150 during steady state decent and landing to increase a range of motion of head 132 and/or to increase the comfort of occupant 110.

Figure 5A:
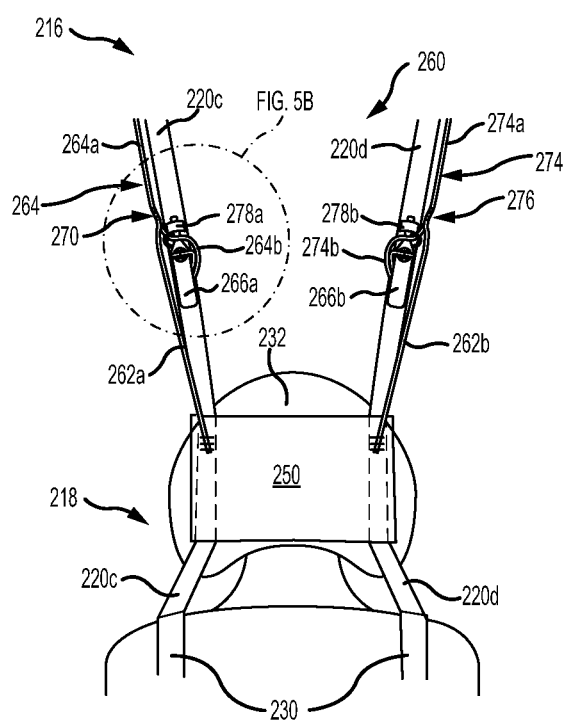
FIGS. 5A, 5B, and 5C illustrate a forward view of a passive head restraint removal system for a parachute assembly, in accordance with various embodiments.

Referring to FIG. 5A, a forward view of a head restraint removal system 260 for a parachute assembly 216 is illustrated, in accordance with various embodiments. Parachute assembly 216 is similar to parachute assembly 116 and may replace parachute assembly 116 in aircraft ejection system 100, with momentary reference to FIG. 1. Parachute assembly 216 includes a head restraint 250. Head restraint 250 may be coupled to a left shoulder riser 220c and a right shoulder riser 220d of parachute assembly 216. Left and right shoulder risers 220c, 220d may be coupled to a harness 230 configured to be worn by, or otherwise secured to, an occupant 218 of parachute assembly 216. Head restraint 250 is configured to be located rearward of a head 232 of occupant 218, upon deployment of parachute assembly 216.

In accordance with various embodiments, parachute assembly 216 further includes head restraint removal system 260. Head restraint removal system 260 includes a first chord 262a and a second chord 262b. First and second chords 262a, 262b are each coupled to head restraint 250. First and second chords 262a, 202b may be coupled to head restraint 250 using any suitable attachment technique, for example, using stitching, adhesive, friction coupling, etc. First and second chords 262a, 262b may comprise any suitable material, for example, rope, canvas, silk, nylon, aramid fiber (e.g., KEVLAR®), polyethylene terephthalate, polyvinyl chloride, etc.

First chord 262a is also coupled to a first control line 264 of parachute assembly 216 at an attachment point 270. First control line 264 is configured to manipulate the canopy of parachute assembly 216. First chord 262a may be coupled to first control line 264 using any suitable attachment technique, for example, using stitching, adhesive, friction coupling, etc. First control line 264 is coupled to a left hand (or first) handle 266a of parachute assembly 216. First control line 264 thus comprises a first length 264a extending from attachment point 270 to the canopy of parachute assembly 216 and a second length 264b extending from attachment point 270 to left hand handle 266a.

Second chord 262b is also coupled to a second control line 274 of parachute assembly 216 at an attachment point 276. Second control line 274 is configured to manipulate the canopy of parachute assembly 216. Second chord 262b may be coupled to second control line 274 using any suitable attachment technique, for example, using stitching, adhesive, friction coupling, etc. Second control line 274 is coupled to a right hand (or second) handle 266*b* of parachute assembly 216. Second control line 274 thus comprises a first length 274*a* extending from attachment point 276 to the canopy of parachute assembly 216 and a second length 274*b* extending from attachment point 276 to right hand handle 266*b*.

Figure 5B:
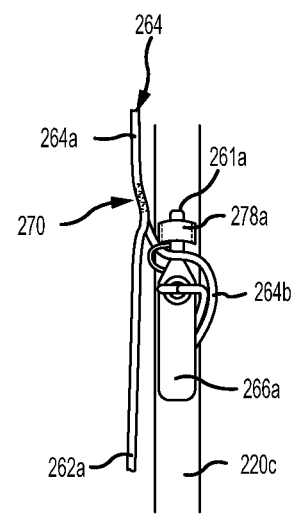

Referring to FIG. 5B, upon initial deployment of parachute assembly 216, left hand handle 266*a* is coupled to left shoulder riser 220*c*. For example, in various embodiments, a first sleeve 278*a* may be attached to left shoulder riser 220*c*. First sleeve 278*a* is configured to receive a tip 261*a* of left hand handle 266*a* and secure left hand handle 266*a* to left shoulder riser 220*c*. First control line 264 may be configured such that, when left hand handle 266*a* is secured to left shoulder riser 220*c*, second length 264*b* is restricted, or otherwise prevented, from deploying. Stated differently, second length 264*b* of first control line 264 may be configured to deploy upon removal of tip 261*a* from first sleeve 278*a*. In this regard, and with momentary combined reference to FIG. 5A and FIG. 5C when left hand handle 266*a* is in a secured to left shoulder riser 220*c* (FIG. 5A), attachment point 270 is located closer to head 232 of occupant 218 (i.e., further from the canopy of parachute assembly 216) as compared to after tip 261*a* is removed from first sleeve 278*a* (FIG. 5C).

Returning to FIG. 5A, upon initial deployment of parachute assembly 216, right hand handle 266*b* is coupled to right shoulder riser 220*d*. For example, in various embodiments, a second sleeve 278*b* may be attached to right shoulder riser 220*d*. Second sleeve 278*b* is configured to receive a tip 261*b* of right hand handle 266*b* and secure right hand handle 266*b* to right shoulder riser 220*d*. Second control line 274 may be configured such that, when right hand handle 266*b* is secured to right shoulder riser 220*d*, second length 274*b* is restricted, or otherwise prevented, from deploying. Stated differently, second length 264*b* of second control line 274 may be configured to deploy upon removal of tip 261*b* from second sleeve 278*b*. In this regard, while right hand handle 266*b* is secured to right shoulder riser 220*d*, attachment point 276 is located closer to 232 head of occupant 218 (i.e., further from the canopy of parachute assembly 216), as compared to after removal of tip 261*b* from second sleeve 278*b*.

Figure 5C:
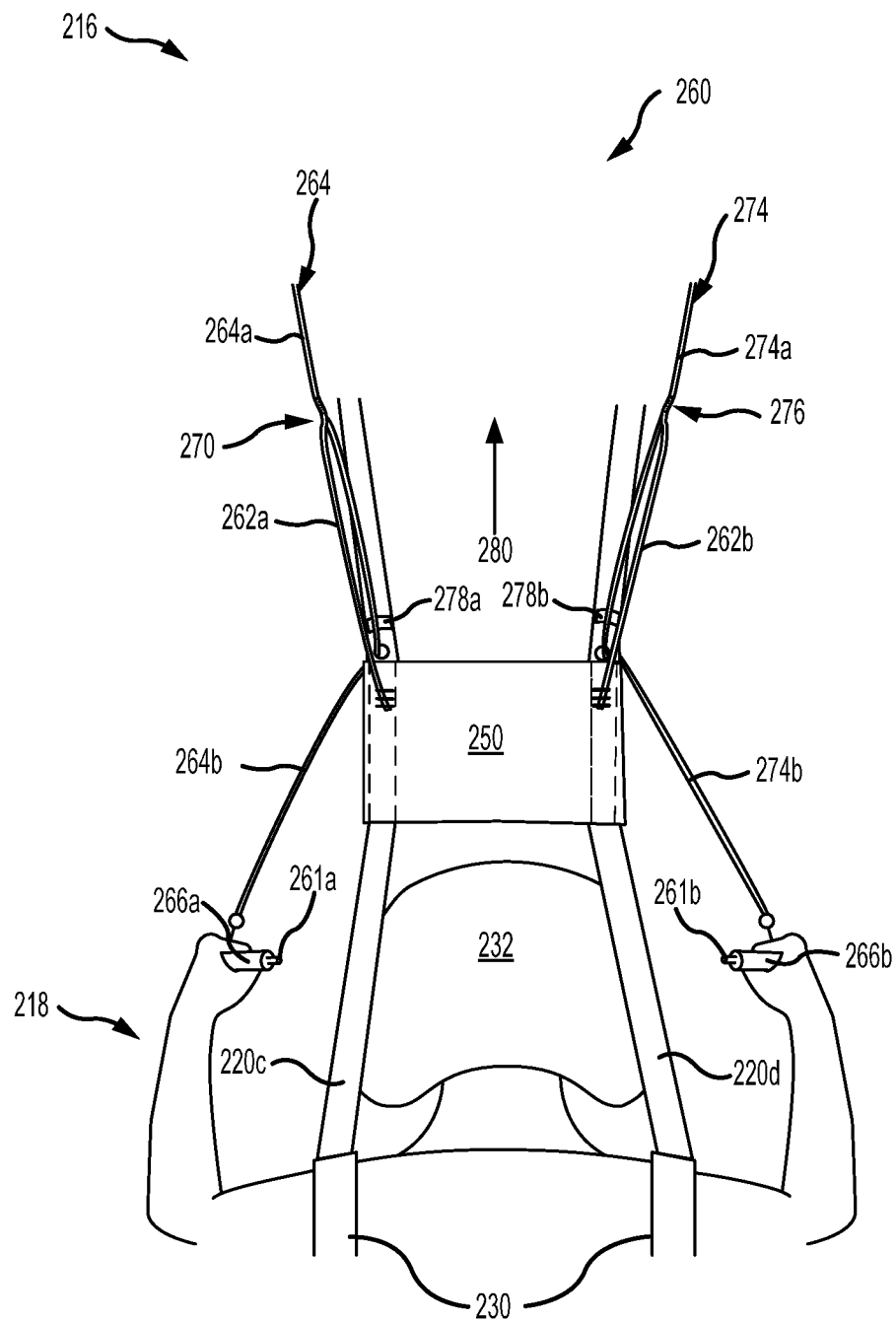

Referring now to FIG. 5C, after initial deployment of parachute assembly 216, for example, after the canopy has fully, or at least substantially, opened, occupant 218 may grasp and decouple left and right hand handles 266*a*, 266*b* from left and right shoulder risers 220*c*, 220*d*, respectively, to begin steering and/or slowing parachute assembly 216 for descent and landing. Second length 264*b* may deploy upon removing tip 261*a* from sleeve 278*a*. Second length 274*b* may deploy upon removing tip 261*b* from second sleeve 278*b*. Deployment of second length 264, 274*b* may allow attachment points 270, 276 to translate generally in the direction of arrow 280. Translation of attachment points 270, 276 in the direction of arrow 280 causes head restraint 250 to also translate in the direction of arrow 280 along left and right shoulder risers 220*c*, 220*d*. Stated differently, occupant 110 removing left and right hand handles 266*a*, 266*b* from left and right shoulder risers 220*c*, 220*d*, respectively, may translate head restraint 250 away from head 232. Head restraint removal system 260 is thus configured to have head restraint 250 limit rearward motion of head 232 during peak deployment forces to reduce possibility of neck injury, and remove head restraint 250 during steady state decent and landing to increase a range of motion of head 232 and/or to increase the comfort of occupant 218.

Figure 6A:
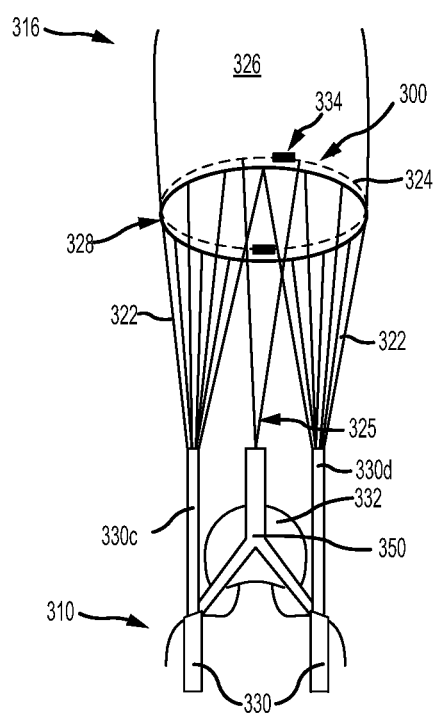
FIGS. 6A and 6B illustrate a reefing line head restraint removal system for a parachute assembly, in accordance with various embodiments.

With reference to FIG. 6A a forward view of a head restraint removal system 300 for a parachute assembly 316 is illustrated, in accordance with various embodiments. Parachute assembly 316 is similar to parachute assembly 116 and may replace parachute assembly 116 in aircraft ejection system 100, with momentary reference to FIG. 1. Parachute assembly 316 includes a canopy 326, and suspension lines 322. Parachute assembly 316 includes a head restraint 350. Head restraint 350 comprises a central riser located between left shoulder riser 320*c* and right shoulder riser 320*d* of parachute assembly 216. Head restraint 350 may be coupled to left and right shoulder risers 320*c*, 320*d* and/or to a harness 330 configured to support an occupant 310 of parachute assembly 316.

In various embodiments, parachute assembly 316 may include one or more reefing line(s) 324. Reefing line 324 may be coupled to canopy 326 proximate a circumferential edge 328 of canopy 326. Reefing line 324 is configured to restrict expansion of canopy 326, such that canopy 326 opens in stages. For example, parachute assembly 316 may include a cutter 380 configured to cut, or otherwise sever, reefing line 324 a preselected time after deployment of canopy 326. Prior to cutting reefing line 324, canopy 326 is held at a first, restricted diameter. After reefing line 324 is severed, canopy 326 is able to open further and its diameter increases. Opening canopy 326 in stages may reduce opening shock to parachute assembly 316 and occupant 310. The time delay between deploying canopy 326 and severing reefing line 324 may comprise any suitable time delay based on properties of parachute assembly 316, the type of aircraft, and/or the load limitations of the object (e.g., occupant 310) being supported by parachute assembly 316.

Head restraint removal system 300 comprises a coupling 325 between head restraint 350 and reefing line 324. In various embodiments, coupling 325 includes one or more suspension lines coupled to reefing line 324 and head restraint 350.

Figure 6B:
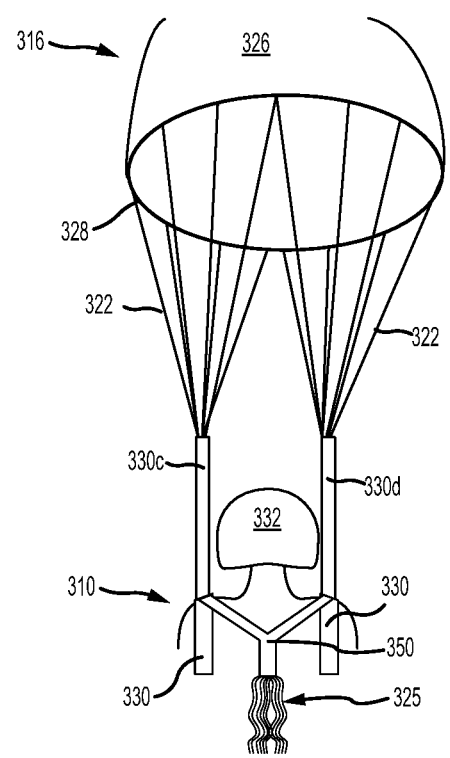

FIG. 6B illustrates parachute assembly 316 after a severing of reefing line 324. Coupling 325 may be incorporated into reefing line 324 such that severing reefing line 324 releases suspension lines 323 from canopy 326. The released suspension lines 323 and head restraint 350 are pulled by gravitational forces toward the ground, thereby removing head restraint 350 from behind head 332. Removing head restraint 350 from head 332 may increase a range of motion of head 332 and/or may allow head 332 to be oriented at a more comfortable angle. Head restraint removal system 300 is thus configured to have head restraint 350 limit rearward motion of head 332 during peak deployment forces to reduce possibility of neck injury, and remove head restraint 350 during steady state decent and landing to increase a range of motion of head 332 and/or to increase the comfort of occupant 310.

Figure 7A:
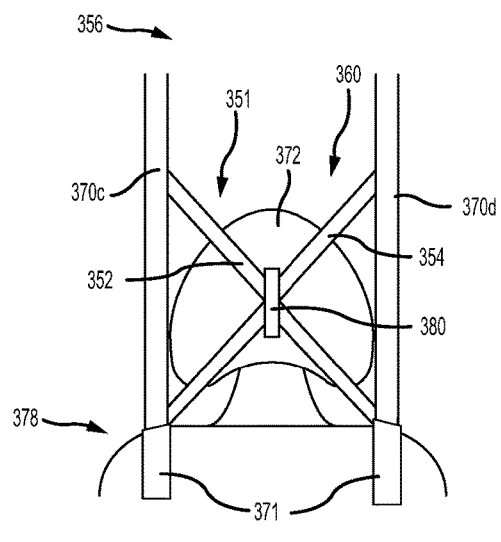
FIGS. 7A and 7B illustrate a strap cutter head restraint removal system for a parachute assembly, in accordance with various embodiments.

With reference to FIG. 7A, a forward view of a head restraint removal system 360 for a parachute assembly 356 is illustrated, in accordance with various embodiments. Parachute assembly 356 is similar to parachute assembly 116 and may replace parachute assembly 116 in aircraft ejection system 100, with momentary reference to FIG. 1.

Parachute assembly 356 includes a head restraint 351. Head restraint 351 includes a first strap 352 and a second strap 354. First and second straps 352, 354 are each coupled to a left shoulder riser 370*c* and a right shoulder riser 370*d* of parachute assembly 356. Left and right shoulder risers 370*c*, 370*d* may be coupled to a harness 371 configured to be worn by, or otherwise secured to, an occupant 378 of parachute assembly 356. Head restraint 351 is configured to be located rearward of a head 372 of occupant 378, upon deployment of parachute assembly 356. In various embodiments, first strap 352 may overlap second strap.

Head restraint removal system 360 includes a cutter 380 configured to sever head restraint 351, such that first and second straps 352, 354 are no longer limit rearward translation of head 372. Cutter 380 may comprise a sear mechanism that is activated in response to a tension in first strap 352 and/or in second strap 354 exceeding a predetermined threshold. The sear mechanism may comprise a trigger mechanism, and/or the like, configured to release a hammer, striker, bolt, blade, shape charge, and/or the like. Once activated, the sear mechanism may release, via an explosive charge, a mechanical spring, and/or the like, the bolt, hammer, striker, bolt, blade, shape charge, and/or the like. The bolt, hammer, striker, bolt, blade, shape charge, and/or the like released from the sear mechanism may sever head restraint 351 such that first and second straps 352, 354 translate away from head 372.

Cutter 380 may be configured to activate during and/or after the deployment of parachute assembly 356. Once activated, a time delay may be initiated before activating the sear mechanism. The time delay may be configured to delay activation of the sear mechanism, and may allow head restraint 351 to restrict rearward translation of head 372 during peak deployment forces The time delay may comprise any suitable time delay based on properties of parachute assembly 356, the type of aircraft, and/or the load limitations of the object being carried by parachute assembly 356. In various embodiments, after the time delay has passed, the sear mechanism in cutter 380 may activate.

Figure 7B:
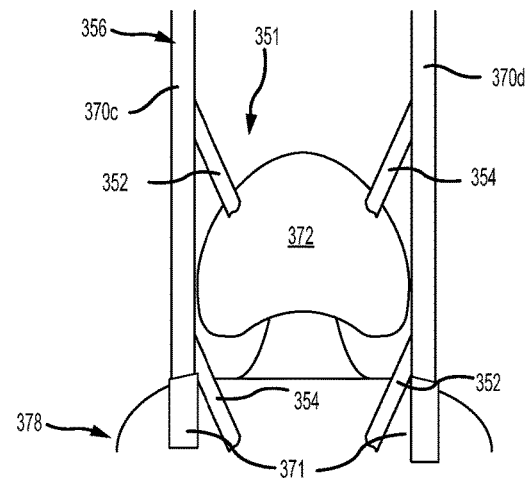

FIG. 7B illustrates parachute assembly 356 after a severing head restraint 351. Removing head restraint 351 from head 372 may increase a range of motion of head 372 and/or may allow head 372 to be oriented at a more comfortable angle. Head restraint removal system 360 is thus configured to have head restraint 351 limit rearward motion of head 372 during peak deployment forces to reduce possibility of neck injury, and remove head restraint 351 during steady state decent and landing to increase a range of motion of head 372 and/or to increase the comfort of occupant 370.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for translating a head restraint of a parachute assembly, comprising:
   a first control line configured to manipulate a canopy of the parachute assembly;
   a first handle coupled to the first control line;
   a first cord coupled to the head restraint and at least one of the first control line or the first handle
   a second control line coupled to the canopy; and
   a second cord coupled to the head restraint, wherein the first cord and the second cord are configured to translate the head restraint along a left shoulder riser and a right shoulder riser of the parachute assembly.

2. The system of claim 1, wherein the first cord is located through an opening defined by a riser of the parachute assembly.

3. The system of claim 1, further comprising a sleeve coupled to a riser of the parachute assembly, wherein the sleeve is configured to retain the first handle proximate the riser.

4. The system of claim 3, wherein the first control line comprises:
   a first length extending from the canopy to an attachment point of the first cord to the first control line; and
   a second length extending from the attachment point to the first handle.

5. The system of claim 4, wherein the second length is configured to be released upon a removal of the first handle from the sleeve.

6. The system of claim 5, wherein the first cord is configured to translate the head restraint along the riser upon release of the second length of the first control line.

7. A parachute assembly, comprising:
   a canopy;
   a plurality of suspension lines coupled to the canopy;
   a first riser coupled to a first suspension line of the plurality of suspension lines;

a second riser coupled to a second suspension line of the plurality of suspension lines;
a control line configured to manipulate the canopy;
a handle coupled to the control line;
a sleeve coupled to the first riser, wherein the sleeve is configured to retain the handle proximate the first riser;
a head restraint located between the first riser and the second riser; and
a head restraint removal system configured to translate the head restraint along the first riser and the second riser, the head restraint removal system comprising a cord coupled to the head restraint and the control line, wherein the control line comprises a first length extending from the canopy to an attachment point of the cord to the control line and a second length extending from the attachment point to the handle, and wherein the second length is configured to release upon removal of the handle from the sleeve, and wherein the head restraint is configured to translate along the first riser and the second riser in response to removal of the handle from the sleeve.

8. The parachute assembly of claim 7, further comprising a reefing line coupled to the canopy.

9. The parachute assembly of claim 7, wherein the cord is located through an opening defined by the first riser.

10. A parachute assembly for an ejection seat, comprising:
a canopy;
a suspension line coupled to the canopy;
a riser coupled to the suspension line;
a head restraint coupled to the riser;
a reefing line coupled to the canopy; and
a coupling between the reefing line and the head restraint, wherein severing the reefing line is configured to release the coupling from the canopy.

* * * * *